(12) United States Patent
Hsu

(10) Patent No.: US 7,811,628 B2
(45) Date of Patent: Oct. 12, 2010

(54) LAYERED LENSES AND METHOD OF LAYERING LENSES

(76) Inventor: Roger Wen-Yi Hsu, 5198 Paddock Pl., Rancho Cucamonga, CA (US) 91737

(*) Notice: Subject to any disclaimer, the term of this patent is extended or adjusted under 35 U.S.C. 154(b) by 775 days.

(21) Appl. No.: 11/644,519

(22) Filed: Dec. 22, 2006

(65) Prior Publication Data

US 2008/0151182 A1 Jun. 26, 2008

(51) Int. Cl.
*B05D 5/06* (2006.01)
(52) U.S. Cl. ..................................................... 427/164
(58) Field of Classification Search .................. 427/162, 427/535, 536; 351/41–51
See application file for complete search history.

(56) References Cited

U.S. PATENT DOCUMENTS

| | | | |
|---|---|---|---|
| 3,937,853 A | 2/1976 | Shank, Jr. | |
| 3,937,854 A | 2/1976 | Shank, Jr. | |
| 4,551,372 A | 11/1985 | Kunert | |
| 4,673,609 A * | 6/1987 | Hill | 428/187 |
| 4,955,709 A * | 9/1990 | Smith | 351/46 |
| 5,073,009 A | 12/1991 | Tori | |
| 5,135,298 A | 8/1992 | Feltman | |
| 5,209,798 A | 5/1993 | Solomon et al. | |
| 5,432,623 A | 7/1995 | Egan et al. | |
| 5,521,655 A * | 5/1996 | Rhoad | 351/51 |
| 5,618,619 A | 4/1997 | Petrmichl et al. | |
| 5,846,649 A | 12/1998 | Knapp et al. | |
| 5,916,401 A | 6/1999 | Gannon | |
| 5,928,718 A | 7/1999 | Dillion | |
| 6,413,700 B1 * | 7/2002 | Hallman et al. | 430/302 |
| 6,415,452 B1 * | 7/2002 | Watanabe et al. | 2/438 |
| 7,014,314 B1 * | 3/2006 | Kamata et al. | 351/159 |
| 7,055,954 B2 | 6/2006 | Marechal | |
| 2004/0070726 A1 | 4/2004 | Ishak | |
| 2004/0087680 A1 * | 5/2004 | Hage | 523/160 |
| 2004/0191533 A1 | 9/2004 | Wendt | |
| 2004/0191682 A1 | 9/2004 | Marechal | |
| 2005/0105048 A1 * | 5/2005 | Warden et al. | 351/177 |
| 2005/0275943 A1 * | 12/2005 | Sugimura et al. | 359/490 |
| 2006/0051501 A1 * | 3/2006 | Conte et al. | 427/162 |
| 2007/0104891 A1 * | 5/2007 | Fournand | 427/561 |

* cited by examiner

*Primary Examiner*—Timothy H Meeks
*Assistant Examiner*—Elizabeth Burkhart
(74) *Attorney, Agent, or Firm*—Alexander Chen, Esq.

(57) ABSTRACT

A method for layering lenses includes: plasma treating a lens surface; applying a removable ink layer onto the lens surface; applying at least one base ink layer over the removable ink layer; applying at least one colored ink layer over the base ink layer; and removing the removable ink layer. Additional steps may include drying the lens, sealing the sides of the lens, and applying liquid to the lens before removing the removable ink layer.

41 Claims, 3 Drawing Sheets

LAYERED LENSES AND METHOD OF LAYERING LENSES

FIELD OF THE INVENTION

This invention is generally related to lenses, and more particularly to layered lenses and a method of layering lenses with pictures or patterns.

BACKGROUND OF THE INVENTION

Eyeglasses, sunglasses, and goggles on the market today may have pictures, camouflage, vacuum colored mirror coatings with pictures, or other patterns printed on the lenses. Inkjet printers and laser printers can be used to print a picture on a lens, but these and other existing methods of putting a picture on a lens have limitations. Prior methods print on a flat surface, and on materials configured to withstand high temperatures such as polycarbonate and very thin plastic (generally where the thickness is less than 1.1 mm). It is difficult or impossible to print on laminated or polarized lenses due to the excess heat required in curing the ink. Such high temperature processing may change the color of the lens, create cracks in the lens, and possibly damage the lamination or the functionality of the polarization coating of the lens.

It is therefore an object of the invention to provide a method of layering lenses with pictures, camouflage, or other patterns, which avoids the problems associated with current printing processes.

SUMMARY OF THE INVENTION

A method for layering lenses may include: plasma treating a lens; applying a removable ink layer to create a mesh-like pattern of clear and shaded areas; applying at least one base ink layer over the clear areas; applying at least one colored ink layer over a base ink layer; and removing the removable ink layer to reveal a see-through lens with an image projected thereon.

The plasma treating may be performed on the outer surface of the lens and may include cleaning and functionalizing in a vacuum chamber or in an open environment. The lens may be a plastic lens selected from the group consisting of: polycarbonate, tri-acetyl cellulose (TAC), polymethyl methacrylate (PMMA), nylon, and cellulose acetate butyrate (CAB). The lens may also be a sunglass lens, may be polarized, may be hard coated, and may be shaped in curved and flat forms. A thin matte finish may be applied to the lens to prevent reflection. An anti-reflective vacuum coating may also be applied to a lens to prevent reflection. In one instance, the lens may be a curved, polycarbonate, polarized lens having a functionalized outer surface, and a series of ink layers applied to the outer surface. The lens may also be use in connection with goggles.

A removable ink layer may be urethane-based and may be applied onto the lens by silk-screening or pad printing to form a mask having a mesh pattern with clear and shaded areas. The base ink layers may be water-based, oil-based, and black, white, or other suitable colors and may be silk screened or pad printed over the removable ink layer to cover at least a portion of the clear areas within the removable ink layer. The base ink layers may include one or more layers. For example, a first dark-colored base ink layer may be covered by a second light-colored base ink layer over. Four colored ink layers may be applied over the base ink layers to form an image; the four colored ink layers may include a cyan layer, a magenta layer, a yellow layer, and a black layer. The image created on the lens may be a camouflage pattern logo or any other pictures.

At least one of the colored ink layers may be silk-screened or pad printed over the base ink layer. After the colored ink layers are applied, the ink may be dried by a blow dryer, an oven, lights, or left to air dry. The sides of the lens may also be sealed with tape for further processing. Water may then be applied to the lens to remove or assist in removing the removable ink layer. In removing the removable ink layer, a scrubbing process using soft scrubbing material may be used in connection with the application of water. The removable ink layer may also be peeled from the lens surface.

BRIEF DESCRIPTION OF THE DRAWINGS

The invention is generally shown by way of reference to the accompanying drawings in which.

DETAILED DESCRIPTION OF THE INVENTION

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

Figure 1:
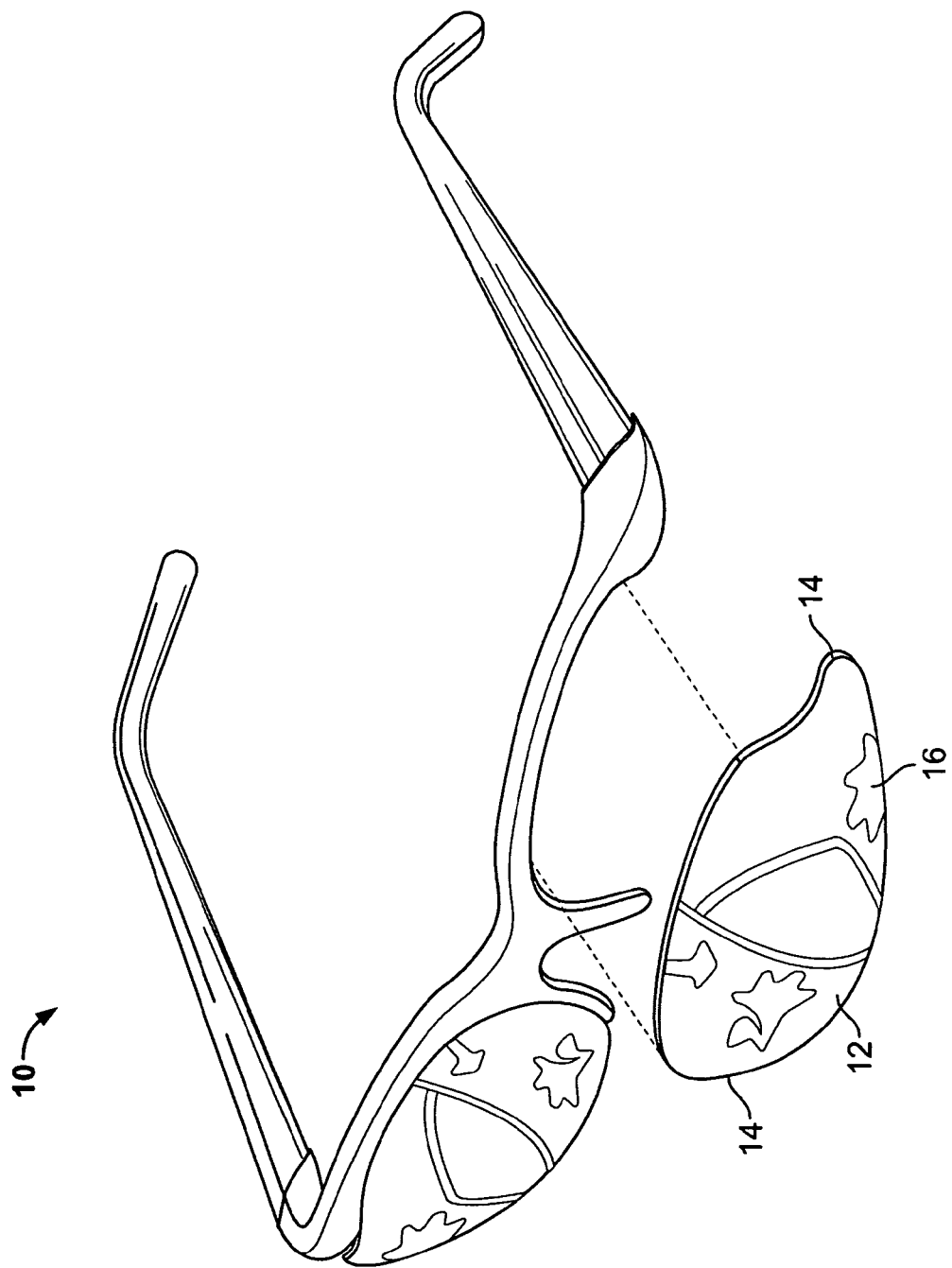
FIG. 1 is a perspective view of sunglasses having curved, polarized, polycarbonate lenses with a pattern projected onto the outer surface of the lenses.

FIG. 1 depicts eyeglasses 10 having lenses 12 with sides 14 and with a camouflage pattern 16 on the outside surface of the lenses. In this embodiment, the camouflage pattern is projected on a curved, polarized, polycarbonate sunglass lens. In other embodiments, the lens made be made of other materials including, but not limited to, unpolarized polycarbonate, tri-acetate cellulose (TAC), TAC polarized laminate, polymethyl methacrylate (PMMA), polarized PMMA laminate, nylon, polarized nylon laminate, cellulose acetate butyrate (CAB), CAB polarized laminate, and other suitable materials. In other embodiments, the lens can also be flat, and be used in connection with prescription glasses. In other embodiments, the lens can be configured for use in connection with goggles. Since the process to prepare the lens does not require high temperatures, the lens may be made of non-heat-resistant materials and the lens may be polarized.

Figure 2:
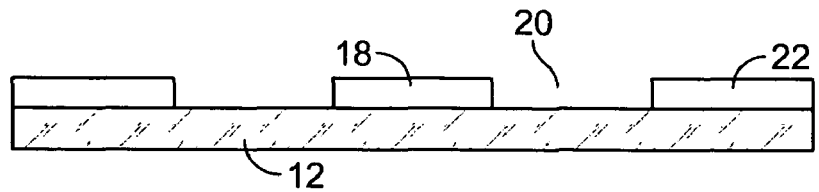
FIG. 2 is an enlarged partial side view of a curved, polarized, polycarbonate sunglass lens having a removable ink layer applied onto an outer surface of the lens, the removable ink layer forming a mask with clear and shaded areas.
Figure 3:
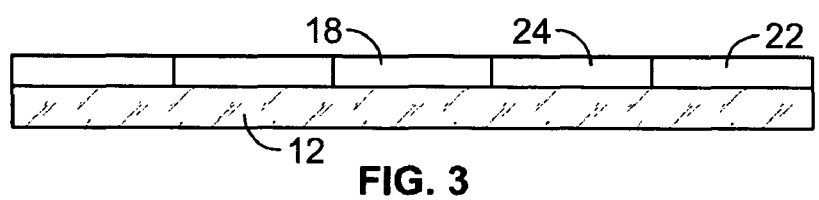
FIG. 3 is an enlarged partial side view of a curved, polarized, polycarbonate sunglass lens having a first base ink layer applied onto an outer surface of the lens, filling at least a portion of the previously clear areas within the removable ink layer.
Figure 4:
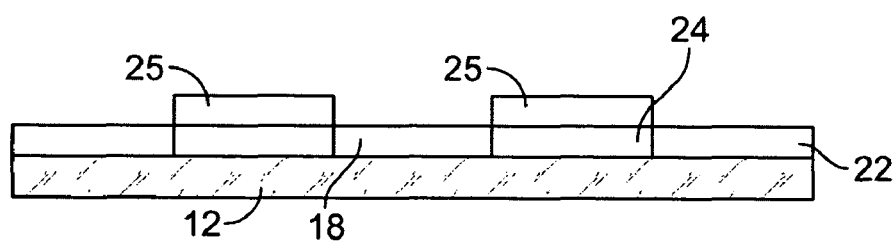
FIG. 4 is an enlarged partial side view of a curved, polarized, polycarbonate sunglass lens having a second base ink layer applied over the first base ink layer.
Figure 5:
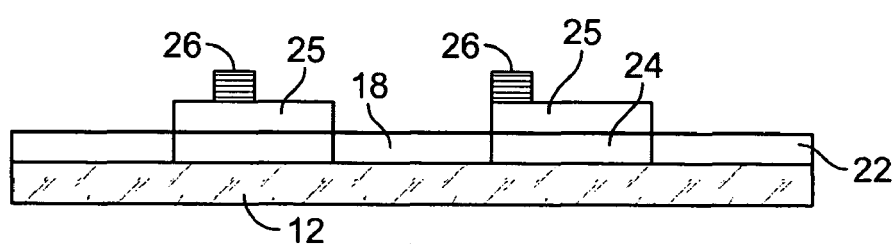
FIG. 5 is an enlarged partial side view of a curved, polarized, polycarbonate sunglass lens having a layer of cyan ink applied over the second base ink layer.
Figure 6:
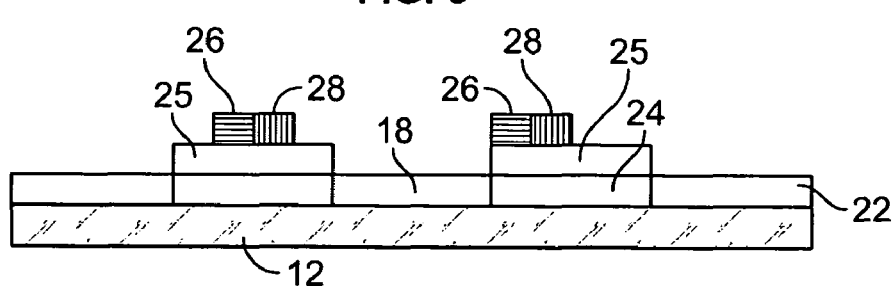
FIG. 6 is an enlarged partial side view of a curved, polarized, polycarbonate sunglass lens having a layer of magenta ink applied over the second base ink layer.
Figure 7:
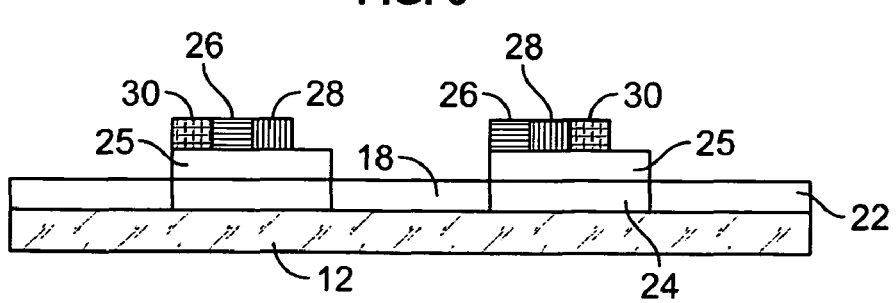
FIG. 7 is an enlarged partial side view of a curved, polarized, polycarbonate sunglass lens having a layer of yellow ink applied over the second base ink layer.
Figure 8:
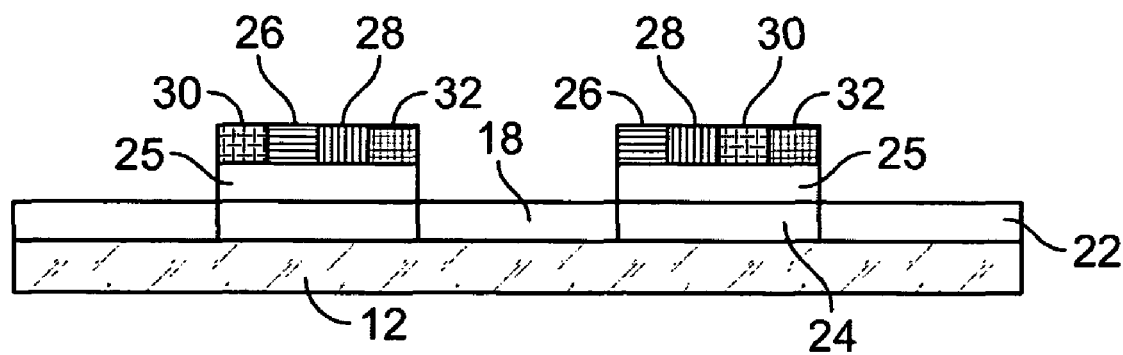
FIG. 8 is an enlarged partial side view of a curved, polarized, polycarbonate sunglass lens having a layer of black ink applied over the second base ink layer.
Figure 9:
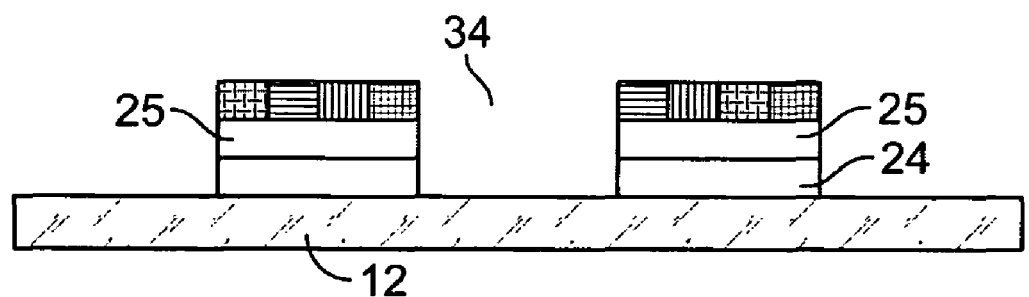
FIG. 9 is an enlarged partial side view of a curved, polarized, polycarbonate sunglass lens after the removable ink layer has been removed.

In this embodiment, the steps taken to prepare the lens 12 with a pattern 16 as shown in FIG. 1 are: plasma treating the outer lens surface; applying a removable ink layer 18 onto the plasma treated lens surface as shown in FIG. 2, where the removable ink layer forms a mesh-like mask with clear 20 and shaded areas 22; applying first and second base ink layers 24, 25, respectively, over the removable ink layer corresponding to at least a portion of the clear areas of the removable ink layer as shown in FIGS. 3 and 4; applying four colored ink layers, cyan 26, magenta 28, yellow 30, and black 32 over the base ink layers as shown in FIGS. 5, 6, 7, and 8, respectively; and then removing the removable ink layer as shown in FIG. 9 to reveal see through sunglasses with openings therein 34 and camouflage images projected thereon.

In this embodiment, the plasma treatment is used to clean and functionalize the outer lens surface. This plasma treatment generally makes the surface clean and even, with small pores, for good contact surface. The plasma treatment is used so that the ink will adhere to the lens without the need for excessive heating, which may damage certain type of lenses. In this embodiment, the treatment is performed in a vacuum chamber, similar to the plasma treating used in the manufacture of semiconductors. In other embodiments, it is possible to perform the plasma treatment at other pressures including in an open environment. In other embodiments, other surfaces of the lens, including the inner surface may also be plasma treated.

After plasma treating, a removable ink material layer 18 is layered onto the outer surface of the lens 12 through silk-screening. The silk-screening process includes placing a first screen over the lens surface and coating the screen with ink. The ink flows through openings in the screen to the lens surface to form the removable ink layer as shown in FIG. 2. While FIGS. 2-9 appear to be side views of flat lenses, said figures are enlarged, partial side views of portions of the curved lens shown in FIG. 1. These enlarged partial views are used to more clearly illustrate the applications of different ink layers to the lens.

The first screen is removed to reveal a mask having a mesh-like pattern with clear 20 and shaded 22 areas. The clear areas will later be filled with additional layers of ink in part to form images on the lens. After the later-applied ink is dried, the removable ink layer 18 will be removed. Removal leaves the lens 12 with a pattern of clear and shaded areas corresponding to a negative of the clear and shaded areas formed by the removable ink layer. Accordingly, the once shaded areas of the lens will be clear, permitting vision through these areas, while the once clear areas of the mask are filled with the later-applied ink. Although a mesh pattern is formed on the lens in this embodiment, in other embodiments, other patterns may be formed on the lens as desired.

While silk-screening is used to apply the removable ink layer 18 in this embodiment, other methods of application, including, but not limited to, pad printing, may be used to accomplish the same or similar objectives. Pad printing in particular may be useful for curved or thick lenses. In pad printing, a pattern is first etched into a pad. The shape of the pad may correspond to the surface of ink application, in this case a curved lens. In application, the pad is pressed against an ink reservoir, the pattern in the pad acting as a transfer reservoir for the ink. The pad is then pressed against the lens surface to transfer the image, in this case, the mesh pattern with clear and shaded areas.

The removable ink layer 18 is formed from ink having mildly adhesive properties. The mild adherence of the ink to the lens permits the removable ink layer to adhere to the lens 12 when additional layers of ink are applied to the lens, yet be removable at or near the final stage of processing. Urethane is used in the removable ink layer to rubberize the material and to make it easier to peel off the lens. While urethane is used in this embodiment, in other embodiments, other materials may be incorporated into this layer to provide the mask with similar properties. After application, the removable ink layer is dried with the application of mild heat to avoid smudging and undesired combination with subsequent ink layers. In other embodiments, the degree of heat may be varied so long as the lens lamination or polarization is not damaged. In still further embodiments, the ink may be allowed to air dry.

After application and drying of the removable ink layer 18, a first base ink material layer 24 is layered over the removable ink layer through silk-screening. Similar to the silk-screen application of the removable ink layer, a screen, in this instance a second screen, is placed over the lens 12. The first base layer ink is then applied to the second screen, passing through openings in this screen. However, the openings in this second screen substantially correspond to the clear areas 20 of the removable ink layer. Therefore, the first base layer ink is for the most part applied directly over the bare lens surface rather than over the removable ink layer. More particularly, the first base ink layer flows substantially onto the clear areas of the lens surface not covered by the removable ink layer. To ensure that the first base ink layer substantially occupies the clear areas of the removable ink layer, the openings within the second screen are substantially aligned with the clear areas of the removable ink layer. This arrangement provides substantially complete coverage and the second screen may be sized to account for slight misalignment on the lens. After the first base layer ink has passed through the second screen and onto the lens, the second screen is removed. While silk-screening is described in this embodiment, other methods of first base ink layer application may include, but are not limited to, pad printing. After application, the first base ink layer is dried with mild heat to avoid smudging and undesired combination with subsequent ink layers. In other embodiments, the degree of heat may be varied so long as the lens lamination or polarization is not damaged. In still further embodiments, the ink may be allowed to air dry.

After application and drying of the first base ink layer 24, a second base ink material layer 25 is layered over the first base ink layer through silk-screening. Similar to the silk-screen application of the first base ink layer, a screen, in this instance a third screen, is placed over the lens 12. The second base layer ink is then applied to the third screen, passing through openings in this screen. Like the application of the first base ink layer, the openings in this third screen substantially correspond to the previously clear areas 20 of the removable ink layer. To ensure that the second base ink layer substantially occupies the previously clear areas of the removable ink layer, the openings within the third screen, like the second screen, are substantially aligned with the previously clear areas of the removable ink layer. This arrangement provides substantially complete coverage and the third screen may be sized to account for slight misalignment on the lens. After the second base layer ink has passed through the third screen and onto the lens, the third screen is removed. While silk-screening is described in this embodiment, other methods of second base ink layer application may include, but are not limited to, pad printing. After application, the second base ink layer is dried with mild heat to avoid smudging and undesired combination with subsequent ink layers. In other embodiments, the degree of heat may be varied so long as the lens lamination or polarization is not damaged. In still further embodiments, the ink may be allowed to air dry.

The first base ink layer 24 in this embodiment is black while the second base ink layer 25 is white. The black finish of the first base ink layer tends to minimize reflection of the image to the user, while the white finish of the second base ink layer tends to maximize the projection of the image. In other embodiments, the first base ink layer may be formed from other dark-colored inks and similarly, the second base ink layer may be formed from other light-colored inks.

The second base ink layer 25 acts as a primer to provide a smooth and suitable backing for later application of colored ink layers. In this particular embodiment, the two base layers are formed from oil-based ink, while in other embodiments, one or both of the base layers may be formed from other types of ink including, but not limited to, water-based ink. In still other embodiments, a base ink layer may include more than two layers or only one layer. In the case of one layer, the base ink layer may be formed from one color including, but not limited to, black, white, and other suitable colors. Because there will only be one layer, this base ink layer will act as a primer to provide a smooth and suitable backing for later application of colored ink layers.

After application and drying of the second base ink layer 25 a series of colored ink material layers 26, 28, 30, 32 are layered over the second base ink layer. Similar to the silk-screen application of the removable ink layer 18 and base ink layers, a screen, in this instance a fourth screen, is placed over the lens 12 for application of the first colored ink layer 26. The first colored ink layer is then applied to the fourth screen, passing through openings in this screen. As with the second and third screens, the openings in this fourth screen correspond to the previously clear areas 20 of the removable ink layer. Therefore, the first colored ink layer is applied over the second base ink layer more so than over the removable ink layer. More particularly, the first colored ink layer flows onto the areas of the lens surface covered by the second base ink layer. However, depending on the image to be projected onto the lens, the openings within the screen are varied to account for the first color. The first colored layer will therefore occupy at least a portion of a previously clear area of the removable ink layer. While silk screening is described in this embodiment, other methods of colored ink layer application may include, but are not limited to, pad printing.

The above-mentioned colored ink application process is performed in this embodiment in four stages corresponding to the application of each of the colors, cyan, magenta, yellow and black (CMYK) in a predetermined order. The resultant combination of colored ink layers 26, 28, 30, 32 forms a camouflage pattern on the lens. To achieve the correct image, the screens used in connection with the applications of the colored ink layers have varied openings therein corresponding to the correct amount and location of ink to be applied at each stage. In this particular embodiment, the colored layers are formed from oil-based ink, while in other embodiments, one or more of the colored layers may be formed from other types of ink including, but not limited to, water-based ink. Between applications of the colored ink layers, the ink is dried with the application of mild heat. In other embodiments, less than four color stages may be used, the screens may be varied to produce other images, and the degree of heat between stages may be varied so long as the lens lamination or polarization is not damaged. In still further embodiments, the ink may be allowed to air dry between color applications.

FIGS. 5-8 show cyan ink 26, magenta ink 28, yellow ink 30 and black ink 32 added over the second base ink layer 25. The colored ink layers are aligned in a mesh-like pattern with the first and second base ink layers. After the colored ink layers are dried, the removable ink layer 18 is removed. The removable ink layer may be peeled or scrubbed away from the surface of lens 12. Any overlap of the first and second base ink layers or colored layers with the previously shaded areas of the removable ink layer is eliminated once the removable ink layer is removed. FIG. 9 shows the lens with the removable ink layer removed from the lens. After removal, the previously shaded areas 22 of the removable ink layer become clear areas 34 and permit vision through the lens.

Since the entire process can be performed at relatively low temperatures and works without using rollers, the ink is less likely to lose its adhesive properties and separate. The printing process is substantially clean because of the protective removable ink layer 18, and ink is less likely to spill or stain because the removable ink layer is removed once all printing processes are completed.

In other embodiments, additional steps may be performed before the removable ink layer 18 is removed. After all the ink is applied, the lens 12 may be dried, by the air, from blow-drying, by light, by oven, or by other processes. The sides 16 (see FIG. 1) around the perimeter of lens may be sealed, possibly with tape, and a liquid such as water is applied to the surface of the lens to assist in removing the removable ink layer by softening the layer. In removing the removable ink layer, a scrubbing process may be used in connection with the application of water. In an alternative embodiment, a water jet may also be used to remove or assist in removing the mask. In further embodiments, additional steps are performed either before or after the removable ink layer is removed. A matte finish can be added to the lens surface to prevent reflection. Anti-reflective vacuum coating can also be added to either the inner or outer surface of the lens.

While several embodiments have been described in detail, it should be appreciated that various modifications and/or variations may be made without departing from the scope or spirit of the invention. In this regard it is important to note that practicing the invention is not limited to the applications described herein above. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein above. Thus, it is intended that the invention cover all such embodiments and variations as long as such embodiments and variations come within the appended claims and its equivalents.

What is claimed is:

1. A method for layering materials onto lenses comprising: plasma treating at least one lens surface, the lens having inner and outer surfaces as well as sides; applying a removable ink layer over at least a portion of the plasma treated lens surface, wherein said removable ink layer is comprised of urethane rubberized material; the removable ink layer forming clear and shaded areas on the lens surface; applying at least one base ink layer over at least a portion of the clear areas on the lens surface such that said shaded area is clear of said base ink layer; applying at least one colored ink layer over at least a portion of a base ink layer and not over any portion of said shaded area; and removing the removable ink layer.

2. The method for layering materials onto lenses of claim 1, wherein: the lens comprises a plastic lens.

3. The method for layering materials onto lenses of claim 2, wherein: the plastic lens comprises a material selected from the group consisting of: polycarbonate, tri-acetyl cellulose (TAC), polymethyl methacrylate (PMMA), nylon, and cellulose acetate butyrate (CAB).

4. The method for layering materials onto lenses of claim 2, wherein: the plastic lens comprises a material selected from the group consisting of: polarized polycarbonate, polarized tri-acetyl cellulose (TAC), polarized polymethyl methacrylate (PMMA), polarized nylon, and polarized cellulose acetate butyrate (CAB).

5. The method for layering materials onto lenses of claim 1, wherein: the lens comprises a curved lens.

6. The method for layering materials onto lenses of claim 1, wherein: the lens comprises a flat lens.

7. The method for layering materials onto lenses of claim 1, wherein: the lens comprises a sunglass lens.

8. The method for layering materials onto lenses of claim 1, wherein: the sunglass lens comprises a polarized lens.

9. The method for layering materials onto lenses of claim 1, wherein: the lens comprises a goggle lens.

10. The method for layering materials onto lenses of claim 1, wherein: the plasma treating is performed on the outer surface of the lens.

11. The method for layering materials onto lenses of claim 1, wherein: the plasma treated lens surface has a hard-coated surface.

12. The method for layering materials onto lenses of claim 1, wherein: the plasma treating comprises plasma cleaning and functionalizing.

13. The method for layering materials onto lenses of claim 12, wherein: the plasma cleaning and functionalizing is performed in a vacuum chamber.

14. The method for layering materials onto lenses of claim 12, wherein: the plasma cleaning and functionalizing is performed in an open environment.

15. The method for layering materials onto lenses of claim 1, wherein: the removable ink layer is silk-screened onto the lens.

16. The method for layering materials onto lenses of claim 1, wherein: the removable ink layer is pad printed onto the lens.

17. The method for layering materials onto lenses of claim 1, wherein: the removable ink layer is applied onto the lens to form a mesh pattern.

18. The method for layering materials onto lenses of claim 1, wherein: at least one base ink layer is oil-based.

19. The method for layering materials onto lenses of claim 1, wherein: at least one base ink layer is water-based.

20. The method for layering materials onto lenses of claim 1, wherein: at least one base ink layer is black.

21. The method for layering materials onto lenses of claim 1, wherein: at least one base ink layer is white.

22. The method for layering materials onto lenses of claim 1, wherein: at least one base ink layer is silk-screened.

23. The method for layering materials onto lenses of claim 1, wherein: at least one base ink layer is pad printed.

24. The method for layering materials onto lenses of claim 1, wherein: four colored ink layers are applied over a base ink layer to form an image, the colored ink layers comprising: a cyan layer; a magenta layer; a yellow layer; and a black layer.

25. The method for layering materials onto lenses of claim 24, wherein: the image formed by the four colored ink layers is a camouflage pattern.

26. The method for layering materials onto lenses of claim 1, wherein: at least one of the colored ink layers is silk-screened over a base ink layer.

27. The method for layering materials onto lenses of claim 1, wherein: at least one of the colored ink layers is pad printed over a base ink layer.

28. The method for layering materials onto lenses of claim 1, wherein: after the colored ink layers are applied, the ink is dried by a blow dryer.

29. The method for layering materials onto lenses of claim 1, wherein: after the colored ink layers are applied, the ink is dried by an oven.

30. The method for layering materials onto lenses of claim 1, wherein: after the colored ink layers are applied, the ink is dried by lights.

31. The method for layering materials onto lenses of claim 1, wherein: after the colored ink layers are applied, the ink is left to air dry.

32. The method for layering materials onto lenses of claim 1, wherein: after the colored ink layers are applied, the sides of the lens are sealed.

33. The method for layering materials onto lenses of claim 32, wherein: the sides of the lens are sealed with tape.

34. The method for layering materials onto lenses of claim 1, wherein: after the colored ink layers are applied, water is applied to the lens surface.

35. The method for layering materials onto lenses of claim 1, wherein:
removing the removable ink layer comprises scrubbing the removable ink layer from the lens surface.

36. The method for layering materials onto lenses of claim 1, wherein:
removing the removable ink layer comprises peeling the removable ink layer from the lens surface.

37. The method for layering lenses of claim 1, further comprising: adding a matte finish on the lens surface to prevent reflection.

38. The method for layering materials onto lenses of claim 1, further comprising: adding anti-reflection vacuum coating on the lens surface.

39. The method for layering materials onto lenses of claim 1, wherein: in applying at least one base ink layer over at least a portion of the clear areas on the lens surface; the application comprises: applying a first base ink layer; and applying a second base ink layer over the first base ink layer.

40. The method for layering materials onto lenses of claim 39, wherein: the first base ink layer comprises a black-colored ink; and the second base ink layer comprises a white-colored ink.

41. The method for layering materials onto lenses of claim 40, wherein: the first base ink layer comprises an oil-based ink; and the second base ink layer comprises an oil-based ink.

* * * * *